(12) United States Patent
Wegner

(10) Patent No.: US 7,531,269 B2
(45) Date of Patent: May 12, 2009

(54) BATTERY COMPRISING AT LEAST ONE ELECTROCHEMICAL STORAGE CELL AND A COOLING DEVICE

(75) Inventor: Bernd Wegner, Blaustein (DE)

(73) Assignee: Daimler AG, Stuttgart (DE)

( * ) Notice: Subject to any disclaimer, the term of this patent is extended or adjusted under 35 U.S.C. 154(b) by 803 days.

(21) Appl. No.: 10/516,051

(22) PCT Filed: Mar. 26, 2003

(86) PCT No.: PCT/EP03/03113

§ 371 (c)(1), (2), (4) Date: Nov. 29, 2004

(87) PCT Pub. No.: WO03/103083

PCT Pub. Date: Dec. 11, 2003

(65) Prior Publication Data

US 2006/0078789 A1 Apr. 13, 2006

(30) Foreign Application Priority Data

May 29, 2002 (DE) .............................. 102 23 782

(51) Int. Cl.
*H01M 10/50* (2006.01)
*H01M 2/36* (2006.01)
*B60R 16/04* (2006.01)

(52) U.S. Cl. .................... 429/120; 429/72; 180/68.5

(58) Field of Classification Search ................ 429/120, 429/72
See application file for complete search history.

(56) References Cited

U.S. PATENT DOCUMENTS 5,487,955 A * 1/1996 Korall et al. .................. 429/26
6,042,961 A * 3/2000 Verhoog et al. ............... 429/72
6,087,038 A 7/2000 Flament et al. ............. 429/120
6,228,524 B1 5/2001 Köhler et al. ................ 429/62
6,498,406 B1 12/2002 Horiuchi et al. ............. 307/150
2004/0069620 A1 4/2004 Bitsche et al. ........... 204/228.6

FOREIGN PATENT DOCUMENTS

DE 32 24 161 12/1983
DE 195 03 085 9/1996

(Continued)

OTHER PUBLICATIONS

Office Action from Japanese Patent Office of Jul. 2, 2008 with translation (7 pages + 5 pages).

*Primary Examiner*—Patrick Ryan
*Assistant Examiner*—Julian Mercado
(74) *Attorney, Agent, or Firm*—Davidson, Davidson & Kappel, LLC

(57) ABSTRACT

A battery has at least one electrochemical storage cell and a cooling device. The at least one electrochemical storage cell is placed between parts of the cooling device. The cooling device is flown through by a liquid cooling medium. According to the invention, each electrochemical storage cell is accommodated inside an opening of the cooling device and is, at least in part, in non-positive contact with the cooling device each time via at least one outside surface that is curved in a direction perpendicular to a longitudinal axis of the electrochemical storage cell. The cooling device comprises at least one expansion joint in the areas of non-positive contact.

20 Claims, 3 Drawing Sheets

FOREIGN PATENT DOCUMENTS

| | | |
|---|---|---|
| DE | 197 50 069 | 5/1999 |
| DE | 100 03 247 | 8/2000 |
| DE | 100 34 134 | 1/2002 |
| FR | 2 782 399 | 2/2000 |
| JP | 2-138858 U | 11/1990 |
| JP | 09-266016 | 10/1997 |

* cited by examiner

BATTERY COMPRISING AT LEAST ONE ELECTROCHEMICAL STORAGE CELL AND A COOLING DEVICE

The invention relates to a battery having at least one electrochemical storage cell and a cooling device, with the at least one electrochemical storage cell being arranged between parts of the cooling device and with a liquid cooling medium flowing through the cooling device.

BACKGROUND

DE 195 03 085 A1 discloses a battery module in which two or more electrochemical storage cells are kept at a distance from one another by means of the fittings which electrically isolate them and form channels for a liquid cooling medium. The fittings thus, inter alia, form a cooling device, between which the individual storage cells are arranged. The cooling medium is supplied and carried away via special channels whose cross section through which flow can pass is designed such that it results in uniform cooling for the storage cells.

The design of the fittings and of the channels is accordingly very complex and requires a large number of individual components, which must each be sealed with respect to one another. In order to make it possible for the fittings to rest flat against the flat faces of the storage cells thus allowing heat to be transferred it is also necessary to comply with extremely tight manufacturing tolerances both for the storage cells and for the fittings, and this is associated with a considerable cost penalty. If, furthermore, it is intended to use storage cells which are not designed to be flat but have curved outer surfaces, in contrast to the storage cells in the document mentioned above, for example cylindrical storage cells, then the problems relating to the manufacturer tolerances become even more important. This may even lead to production no longer being possible with an acceptable degree of effort, at least in the case of cylindrical storage cells.

Furthermore, batteries are known from the general prior art which are cooled by means of air as the cooling medium. Batteries such as these are described, for example, in DE 32 24 161 A1 and DE 100 03 247 A1.

Feed devices, such as fans or the like, are in each case required to feed the air as a cooling medium, and disadvantageously result in considerable noise being emitted. Furthermore, for some battery types, the cooling performance which can be achieved by means of the air is not sufficient, when the highly dynamic changes take place between charging and discharging, in particular when charging with very heavy currents, for example for storage of braking recuperation energy when used in motor vehicles.

SUMMARY OF THE INVENTION

An object of the present invention is to provide a battery having at least one electrochemical storage cell and a cooling device that can be loaded in a highly dynamic version, that can be produced easily and at low cost and that avoids the disadvantages mentioned.

The present invention provides a battery wherein at least one electrochemical storage cell is held in at least one opening of the cooling device and at least one outer surface, which is curved in a direction at right angles to a longitudinal axis of the electrochemical storage cell, at least partially makes a force-fitting contact with the cooling device in each case, with the cooling device having at least one expansion joint in the areas of the force-fitting contact.

The highly efficient and advantageous design of the cooling device according to the invention makes it possible to use conventional, known, storage cells which are freely available, in particular high-power storage cells, such as nickel metal hydride or lithium cells. These storage cells, which are normally cylindrical and have at least one curved surface, can be cooled ideally for the configuration of the cooling device as described above in the battery according to the invention. The liquid cooling medium which is used in this case ensures comparatively high cooling power without excessively large volume flows of the cooling medium being required for this purpose. The volume flows that are required can in fact be provided by a single low-cost feed device. For the preferred application of the battery according to the invention in a motor vehicle, the cooling circuit for the cooling device can, in particular, also be combined with an air-conditioning system or its cooling circuit, which is normally present.

The fact that the cooling cell is held in the opening and provision of the expansion joint in the area of the contact between the storage cell and the cooling device means that the wall of the cooling device rests elastically against the storage cell, at least in places, so that this allows for the force-fitting contact of over a very large area in the area of the curved outer surface of the storage cell. In this case, the manufacturing tolerances to be complied with are comparatively wide, since the elasticity which is created by means of the expansion joint makes it possible to compensate for the tolerances. In a comparable configuration without this characteristic according to the invention, very narrow tolerances, which are thus expensive and complex to manufacture, would have to be complied with both for the outer surface of the storage cell and for the opening in order to achieve a correspondingly large contact area which is sufficient for adequate thermal conduction from the storage cell to the cooling device through which the cooling medium flows, for the required cooling power.

According to one highly advantageous development of the battery, its cooling device is formed from a plastic, with the at least one opening and the at least one expansion joint being aligned predominantly in the direction of the longitudinal axis of the electrochemical storage cells.

The use of a plastic for production of the cooling device means that there is no need for electrical insulation between the individual storage cells. This task is carried out by the cooling device. In consequence, the thickness of the material between the cooling medium flowing in the cooling device and the storage cell to be cooled is minimized. In addition, the number of thermal junctions required between different materials is reduced. This allows the cooling power to be achieved to be increased further.

Furthermore, the alignment of the expansion joint predominantly in the direction of the longitudinal axis of the storage cell results in the elasticity as already mentioned above in a manner which allows the wall of the cooling device to rest over as large an area as possible on the outer surface of the storage cell. The minimizing of the gap spaces between the storage cell of the cooling device which results from this means that a very large proportion of the thermal emission is achieved with only a very small proportion of thermal radiation into the area without direct contact between the storage cell and the cooling device. The cooling power can thus be even further optimized.

According to one preferred embodiment, the battery comprises two or more of the electrochemical storage cells, which are each cylindrical and are arranged in the openings of the cooling device, with the openings being arranged very densely packed since the longitudinal axes of the openings and of the electrochemical storage cells each run at least approximately parallel to one another.

The cylindrical storage cells, which are arranged in a very dense "spherical packing" as known from crystallography are located in two or more rows, which are each separate with respect to one another, by half the diameter of the storage cells. In this case, the individual storage cells are each parallel to one another. The arrangement allows the individual storage cells to be packed very densely in the battery unit, with the spaces which remain between the individual storage cells offering sufficient space for cooling and for further functional elements in the area of the cooling device. The battery size is optimized by this very advantageous refinement in the invention, for an ideal cooling capability and the best possible functionality.

In one highly advantageous development of this idea according to the invention, the areas between the individual openings for the electrochemical storage cells each have aperture wall openings which are separated from the cooling medium by walls and whose center axes are arranged at least approximately parallel to the longitudinal axes of the electrochemical storage cells.

The aperture openings, which are arranged in the areas between the individual openings for the electrochemical storage cells, the so-called gaps, and have no direct contact with the cooling medium, allow the accommodation of functional elements, such as an attachment means, electrical connections or the like. Since the cooling medium likewise flows through the aperture openings the cooling is also used for these functional elements, if this is necessary.

In one highly advantageous development of this idea, the walls of the openings for the electrochemical storage cells together with the walls of the expansion joints and the walls of the aperture openings in each case form cooling channels which run parallel to the longitudinal axes, with the cooling channels being connected to at least one distribution channel for distribution of the cooling medium into the cooling channels, and being connected to at least one collecting channel for collection of the cooling medium from the cooling channels.

This configuration with the best possible elasticity and the advantages associated with this as already described above allows the capability to cool a very large number of storage cells at the same time and very uniformly by two or more of the cooling channels in each case.

In one advantageous development of the invention, it is also possible to provide for the openings for the electrochemical storage cells and the aperture openings to have at least one of the channels for collection and/or distribution of the cooling medium passing through it.

This therefore makes it possible to ensure the accessibility to the storage cells from at least one side. The corresponding simplifications for assembling and maintenance of the battery should be obvious. In this case, the individual storage cells may be either openings in the form of blind holes or else continuous openings, which allows accessibility to the storage cell from both sides.

In a further highly advantageous refinement of this development of the battery according to the invention as mentioned above, the expansion joints do not extend in the openings as far as the area of the at least one channel for collection and/or distribution of the cooling medium, with the openings for the electrochemical storage cells having a larger diameter in the area of the at least one cannel for collection and/or distribution of the cooling medium than in the area of the expansion joints, and with the diameter in the area of the expansion joints being smaller than the diameter of the electrochemical storage cells when the electrochemical storage cells are not inserted.

According to this refinement, the individual storage cells can be inserted into the opening without any contact, or at least without any significant contact, with the channel and/or the channels for collection and/or distribution of the cooling medium. The correspondingly smaller diameter of the opening in the area of the expansion joint then results in elastic deformation of the cooling channels and to the storage cell being clamped in this area. The clamping in this case on the one hand represents the force-fitting contact, which is optimized for thermal conduction, between the wall of the cooling channel and the outer surface of the storage cell and, on the other hand, thus also mechanically holds the storage cell, and fixes it in its position. All that is required for mechanical assembly of the battery is thus to insert the storage cells into the openings of the cooling device, without any processes being required, such as attachment or the like.

One particularly suitable and advantageous application for a battery such as this and based on one or more of the refinement options mentioned above is to use it as an electrical energy storage device in a vehicle having at least one electrical machine that is used for traction purposes.

A battery as described by the invention allows very high electrical power per unit volume. It allows operation, in particular charging and discharging, with very heavy currents, since the heat losses which are unavoidably produced in this case can be optimally transported away by the cooling device. These aspects predestine the battery for use in motor vehicles since, particularly in this case, the requirements relating to the stated aspects are very stringent. In this case, it is irrelevant whether the battery is used solely for supplying traction components, being charged from the stationary electricity generator and possibly being recharged with power which has been obtained during braking recuperation, or is used for the purposes of a hybridized traction and/or power supply system.

BRIEF DESCRIPTION OF THE DRAWINGS

Further advantageous refinements of the invention will become evident from the remaining dependent claims and from the exemplary embodiment, which is explained in the following text with reference to the drawing, in which:

DETAILED DESCRIPTION

Figure 1:
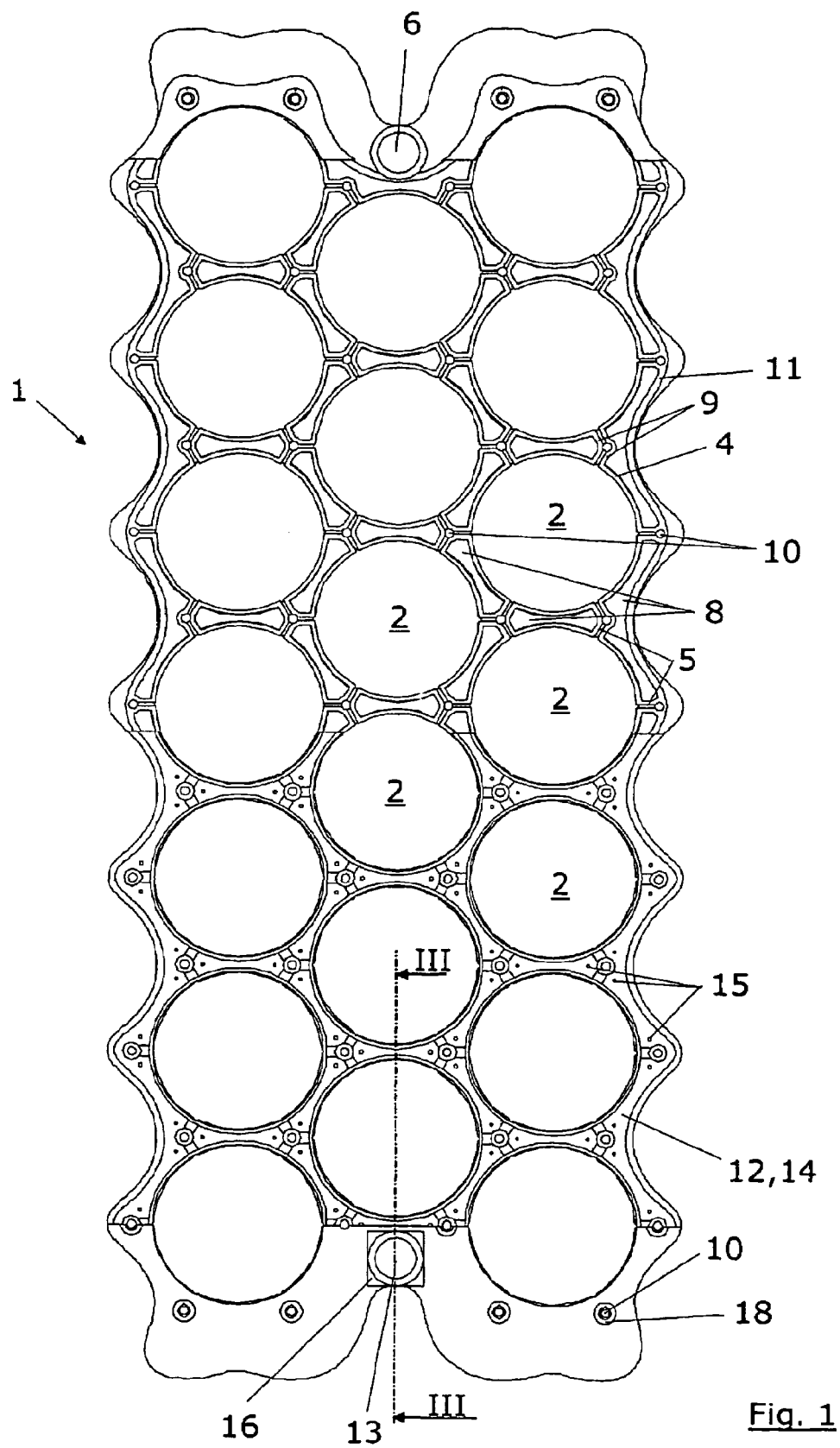
FIG. 1 shows an illustration of a cooling device for a battery according to the invention, in the form of a partially sectioned plan view.

FIG. 1 shows a partially sectioned illustration, in the form of a plan view, of a cooling device 1. The cooling device 1 in this case has numerous openings 2 for holding the storage cells 3, which are not illustrated explicitly. The cross-sectional shape of the openings 2 corresponds at least approximately to the cross section of an external surface of the storage cells 3, which is curved in at least one direction at right angles to the longitudinal axis of the storage cell 3. In the exemplary embodiment described here, the storage cells 3 are cylindrical, although the idea of the invention is not restricted to a cylindrical shape such as this. In order to make FIG. 1 clear, only some of the openings 2 have been provided with reference symbols—in the same way as the components which will also be explained in the following text—even though there are in each case two or more of the respective elements, as can easily be seen.

The storage cells 3 themselves now make force-fitting contact with the cooling device 1 in the area of the cylindrical outer surface, in this case making contact, in particular, with walls 4 of the openings 2. The force-fitting contact allows the walls 4 to directly touch the outer surfaces of the storage cells 3. Nevertheless, a certain amount of elasticity of the material of the walls 4, which is furthermore supported by expansion joints 5 in the area of the walls 4, allows comparatively large surface areas to make direct force-fitted contact between the walls 4 and the outer surface of the storage cells 3, despite any shape and/or dimension discrepancies (resulting from manufacture) between the individual openings 2 and the individual storage cells 3. Heat can therefore be dissipated very efficiently to the walls 4 of the cooling device 1, which are themselves cooled by a liquid cooling medium. The cooling power that is possible can be increased considerably in comparison to the conventional systems.

Various substances may be used as the material for the cooling device 1. In addition to metals such as aluminum, which can be processed easily, in particular by means of die-casting methods, plastics in particular playa critical role here. Since conventional cylindrical storage cells 3 generally have a metallic outer surface with an insulation film, there are two thermal junctions when using metallic cooling devices 1, firstly from the outer surface to the insulation film, and then from the insulation film to the cooling device 1. If, in contrast, a plastic (such as polypropylene (PP) polyamide (PA) or the like) is used, then there is no need for the insulation film. In addition to just saving the insulation film and the assembly effort associated with it, it is also possible to halve the number of thermal junctions and thus to improve the efficiency of the heat transmission when using system-integrated insulation. Furthermore, plastics such as these can be processed comparatively easily, for example by injection molding, are light in weight, and cost little. The cooling device may, for example, in this case be designed such that it is manufactured from two or possibly from three injection—molded parts, which can then be adhesively bonded to form an integral cooling device.

Furthermore, the use of plastics together with the expansion joints 5 increases the elasticity of the cooling device 1, which in turn further improves the characteristics which have already been mentioned above. It is particularly advantageous in this case for the expansion joints 5 to run predominantly in the direction of the longitudinal axis of the storage cells 3 or of the cylindrical openings 2, since the walls 4 can thus rest tight against the outer surface of the storage cells 3, in an ideal manner.

The design of the cooling device 1 now provides for a liquid cooling medium to flow through it, which cools the walls 4 which in turn make a force-fitting contact over a large area with the storage cells 3 of the battery. The use of a liquid coolant in this case makes it possible to achieve far better cooling than would be the case with a gaseous cooling medium. Efficient cooling is also possible because the walls can be designed to be very thin. In appropriate trials, wall thickness for the walls 4 facing the storage cells 3 of less than 1 mm, in particular of 0.2 to 0.7 mm, have been found to be sufficient in order to ensure electrical isolation of the storage cells 3 with the thermal conduction resistance being as low as possible. Adequate mechanical robustness can in this case be ensured by means of measures that will be explained in more detail later and by means of the other walls which are not directly involved in the process, are correspondingly thicker, and have thicknesses of about 2-5 mm.

Figure 2:
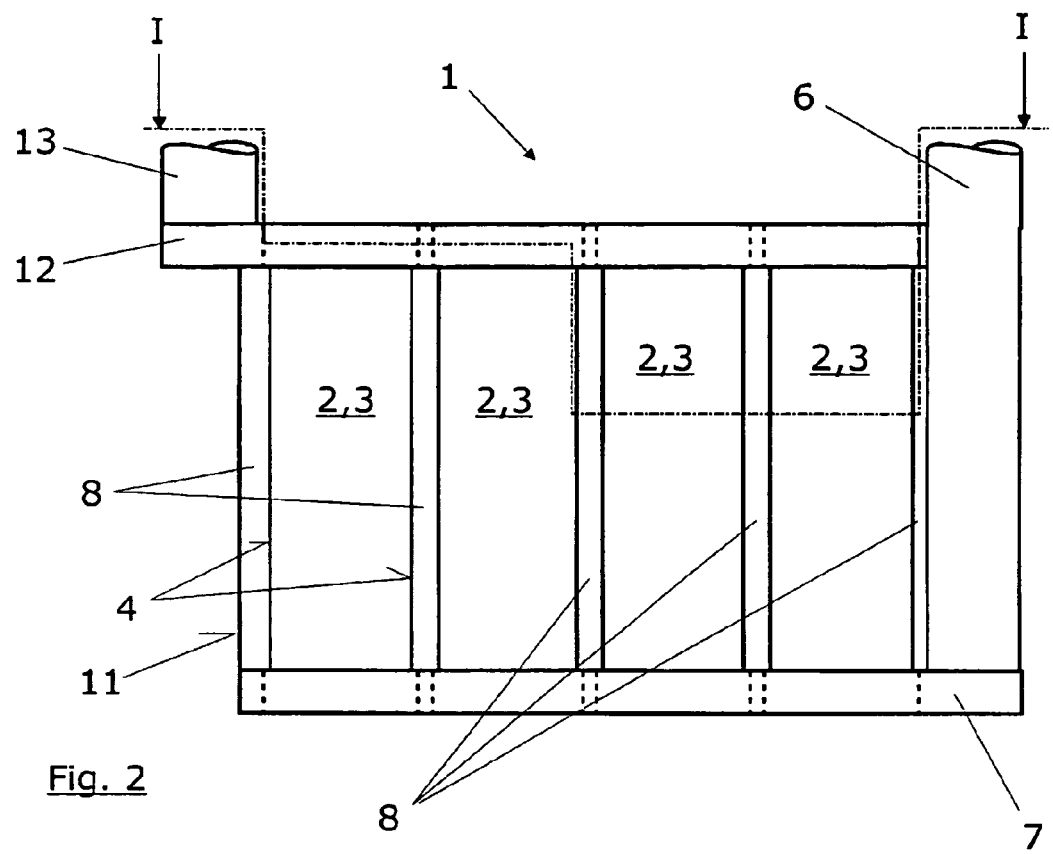
FIG. 2 shows a highly schematic illustration of the cooling device, in the form of a cross section.

FIG. 2 shows a highly schematic illustration of the way in which the liquid cooling medium is intended to flow through the cooling device 1 in an ideal manner. Furthermore, FIG. 2 also shows the section line I-I from the section illustration from FIG. 1 in outline form, in order to illustrate this.

The liquid cooling medium flows via an inlet line 6 into a channel 7 in which the liquid cooling medium is distributed between the cooling channels 8. The channel 7, which is used as a distribution channel runs on one side of the cylindrical openings 2. If the openings 2 pass through the entire cooling device 1, as in the case of the exemplary embodiment which is illustrated here, then the distribution channel 7 passes through the openings 2 in a corresponding manner. In the case of an example which is likewise feasible, in which the openings 2 are in the form of blind holes, the distribution channel 7 could also be formed by a continuous flat channel.

The liquid cooling medium flows out of the channel 7 into the cooling channels 8, which are formed by the walls 4 of the openings 2 and by walls 9 of the expansion joints and of aperture openings 10 which are connected to the expansion joints 5 as can be seen in FIG. 1. The outer walls 11 of the cooling device are also involved in the formation of the cooling channels 8 for those openings 2 which are not surrounded by further openings 2 on all sides.

As can also be seen in FIG. 1, in this design of the cooling device 1, each of the openings 2 and thus also each of the storage cells 3 which are arranged in the openings 2 are surrounded by six of the cooling channels 8, which are each arranged parallel to the longitudinal axes of the cylindrical openings 2 and of the storage cell 3. After flowing through the individual cooling channels 8, the liquid cooling medium passes into a collecting channel 12 where it is collected and is passed through an outlet line 13, through which it leaves the cooling device 1.

FIG. 1 in this case shows the collecting channel 12 in the part of the section illustration facing the outlet line 13. A plate 14, which separates the cooling channels 8 from the collecting channel 12 can be seen between the collecting channel 12 and the cooling channels 8. Only a small number of holes 15 for the cooling medium to pass through are provided for each of the cooling channels 8 in the plate 14. The holes 15 represent a flow resistance for the liquid cooling medium, and thus ensure uniform distribution of the volume flow of the cooling medium, and hence, overall, ensure that the cooling power is distributed evenly between all of the cooling channels 8. The preferred direction for the cooling medium to flow through the cooling device 1 is in this case such that the cooling medium flows into the cooling channels 8, when the battery is being used correctly, against the force of gravity, and accordingly passes through the hole 15 into the collecting channel 12 after flowing through the cooling channels 8. Furthermore, devices for holding sensors, for example temperature sensors or the like may be arranged in the area of the inlet and outlet lines 6, 13 for the cooling medium, and these are indicated in outline form in FIG. 1 and FIG. 3 as a rectangular surface 16 in the area of the outlet line 13.

The aperture openings 10 which have already been mentioned above are located in the areas between the individual cooling channels 8. Each of the aperture openings 10 is connected by means of the expansion joints 5 to the openings 2 surrounding them for the electrochemical storage cells 3, according to the exemplary embodiment illustrated here. The aperture openings 10 and expansion joints 5, which run parallel to one another, thus allow ideal elasticity of the cooling channels 8, with the advantages as already discussed a number of times above. Furthermore, the aperture openings 10 or some of the aperture openings 10 are also used to hold electrically conductive connections between the poles of the electrochemical storage cells 3 and/or electronic components (not illustrated). Together with monitoring electronics, by way of example, the connections can be used to monitor, or the like, the state of charge in the individual storage cells 3. With a suitable configuration of the connections which run through the aperture openings 10, for example in the form of solid rods which fill the aperture openings 10 and are composed of copper or the like, the electronics can likewise be cooled by the cooling device 1 by dissipating heat into the connection.

Figure 4:
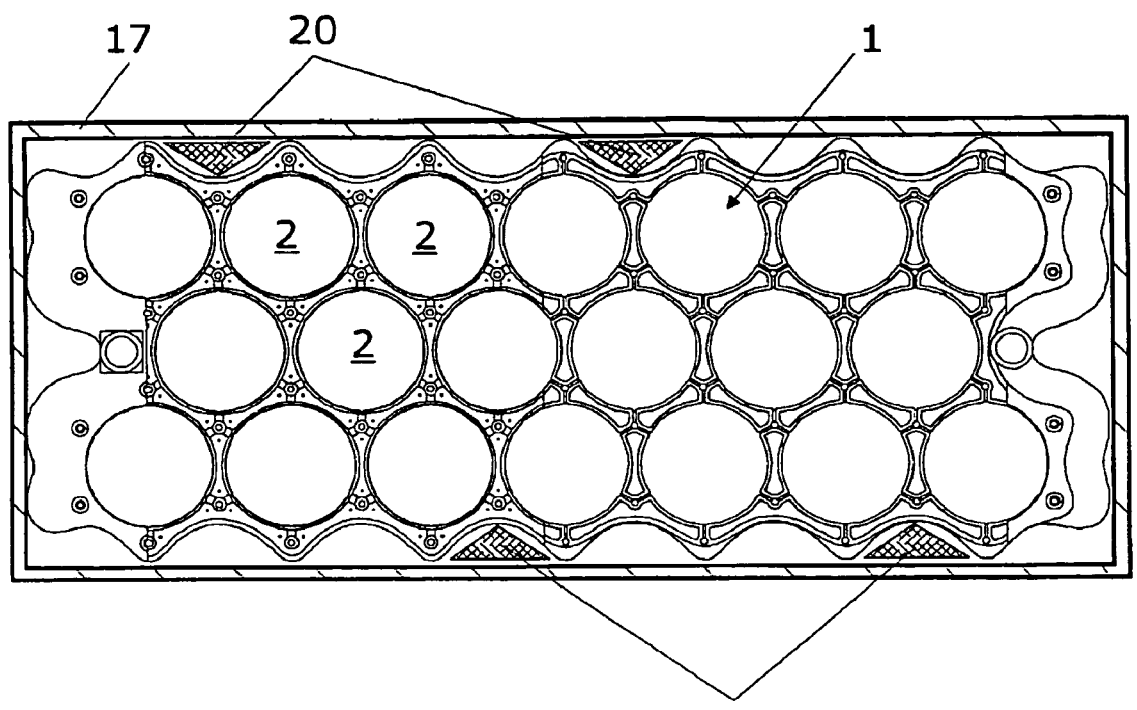
FIG. 4 shows a plan view of the cooling device, in the form of a partial section of the battery according to the invention in a housing.

Attachment means are passed through the further aperture openings 10 (these being the majority of the aperture openings 10), by means of which the cooling device 1 is on the one hand made robust and on the other hand is connected to a housing 17 (which is indicated in FIG. 4) for the battery, and this housing 17 is in general referred to as a battery box. The cooling device 1 can be subjected to compression stress in the direction of the longitudinal axes of the openings 2 by the attachment means, for example screws, thus making it possible to make the entire cooling device 1 mechanically robust. At the same time, the attachment in the housing 17 can be implemented in such a way that the attachment means create a double positive effect.

In order now to make it possible to use the attachment in as worthwhile a manner as possible for mounting in the housing 17, at least some of the aperture elements 10 are lengthened by tubular projections 18 beyond the extent of the cooling device 1 in the direction of the longitudinal axes. These projections 18 are then effectively used as spacers or spacer sleeves, which are formed integrally with the cooling device 1, so that a gap remains between the cooling device 1 and housing 17 when mounted in the housing 17. Electrical connections between the storage cells 3, and electronic components or the like can then be arranged in this gap. If, by way of example, the electrical connections between the storage cells 3 are designed appropriately, then they can also expand like a fan between the projections 18, thus providing additional mechanical robustness for the cooling device 1.

Figure 3:
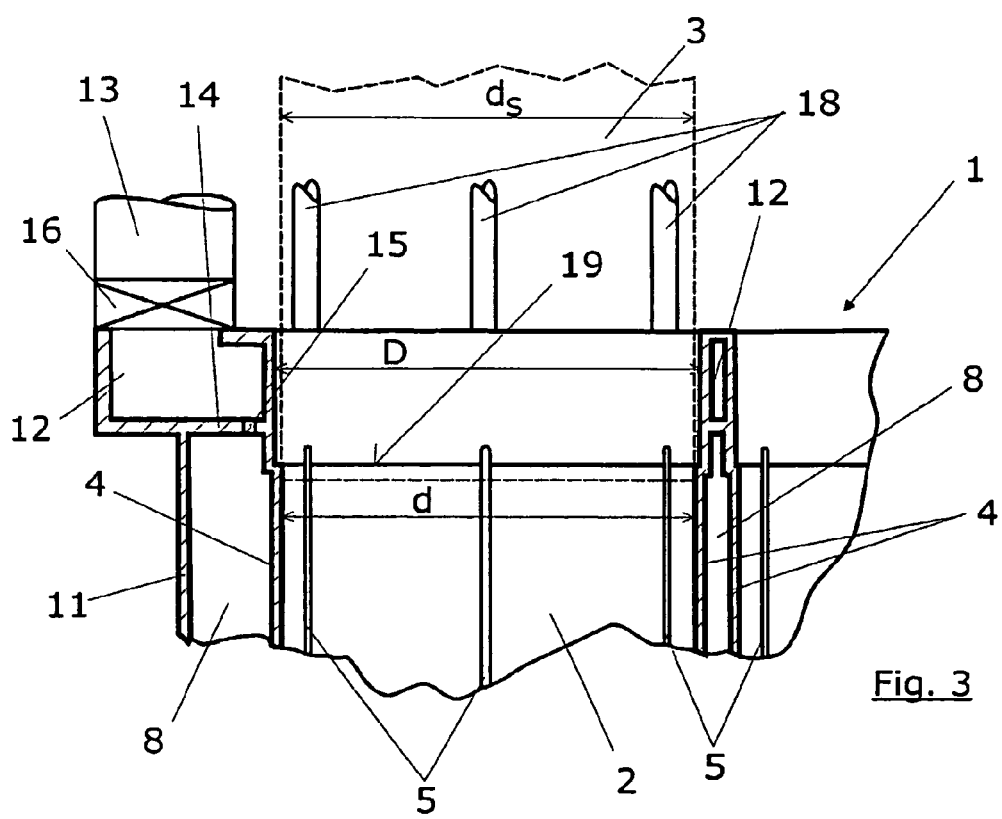
FIG. 3 shows a partial section along the line 111-III in FIG. 1.

FIG. 3 shows a part of one of the openings together with a detail of the collecting channel 12. The highly schematic section illustration in this case relates back to the line III-III in FIG. 1. As can be seen, the expansion joints 5 do not extend into the openings 2, or extend only slightly into the area of the collecting channel 12. A comparable situation also applies to the area of the distribution channel 7. In the area of the at least one channel 12, 7 for collection and/or distribution of the cooling medium, the openings 2 have a larger diameter d than in the area of the expansion joints 5. In this case, the diameter d in the area of the expansion joints 5 where no electrochemical storage cells 3 are inserted (as is indicated schematically here) is minimally smaller than the diameter ds of the electrochemical storage cell 3, while the diameter d is larger than the diameter ds of the storage cell 3. This design results in a characteristic edge 19 at the junction between the diameters d and d. This is now inserted into the opening 2 in the area of the diameter D during installation of the storage cell 3. The process of pushing the storage cell 3 into the area of the opening 2 with the diameter d results in the walls 4 of the openings 2 being correspondingly deformed in this area, which also has the expansion joints 5. The walls 4 rest against the storage cell 3. In addition to the mechanical fixing of the storage cell 3, this also results in the advantages which have been explained a number of times already, resulting from the force-fitting connection over a large area.

The effort for assembly (no explicit attachment is required for the individual storage cell 3) and for production (the manufacturing tolerances are subject only to comparatively minor requirements) can thus be minimized while at least approximately achieving the ideal battery cooling result.

FIG. 4 shows the battery once again, in the form of a schematic plan view with the housing 17 open. The cooling device 1 is analogous to that in FIG. 1, and is thus no longer provided with all the reference symbols. It is arranged in the housing 17, with the arrangement of the openings 2 in the manner illustrated here, which corresponds approximately to very dense spherical packings, as is known from the field of crystallography, resulting in a very compact battery, which can nevertheless be cooled in an ideal manner. In this case, the cooling device 1 itself is sealed both with respect to the electrochemical storage cells 3 and with respect to the housing 17 which surrounds it. The cooling device 1 thus forms its own sealed system, which allows electronics and the like to be integrated in the housing 17.

Depending on the cooling medium which is used, for example, a mixture of water and antifreeze, a heat carrying oil or the like, in conjunction with plastics such as PP or PA which are used in a preferred manner for the production of the cooling device 1, it is possible for sealing problems to occur over a lengthy time period. Particularly in the case of cooling media which contain water and which are undoubtedly normally used by preference in most cases, it is possible for water to diffuse into, and thus in the end also through, the plastic. The sealing of the cooling device 1 is thus no longer 100% ensured.

There are essentially two different approaches which can be used to overcome this. On the one hand, the cooling device 1 and its walls 4, 9, 11 can be provided with a layer which the cooling medium that is being used cannot diffuse. The cooling device 1 can thus be designed to be sealed completely. On the other hand, the amounts of cooling media, for example, water, which emerge by diffusion are very small. One sensible alternative to the diffusion-tight layer may thus also be to use a desiccant, in particular in the form of one or more replaceable cartridges 20, which may be arranged in the area between the housing 17 and the cooling device 1.

A battery constructed in this way complies with the requirements, which have already been explained in the introduction, for being small and space-saving in an at least approximately ideal manner, and is, thus particularly suitable for use as an electrical energy storage device in a vehicle having at least one electrical machine which is used for traction purposes. It is also particularly advantageous for an application such as this in which the inlet and outlet lines 6, 13 are jointly accessible from one side, so that the housing 17 may be in the form of a trough with a cover. A trough, which is intrinsically sealed and is designed to be integral with only one cover—and thus with only a small number of sealing surfaces—is more suitable from the reliability safety point of view than a housing 17 formed from a number of parts, and also simplifies assembly and maintenance. When used in a vehicle, the cooling medium which is used may be a medium which is circulated in a cooling circuit in the vehicle in any case, so that no specific feed device is required, although it is also feasible to construct a dedicated cooling circuit for the battery.

The invention claimed is:

1. A battery comprising:
   at least one electrochemical storage cell defining a longitudinal axis and having an outer surface curved in a direction perpendicular to the longitudinal axis;
   a cooling device having at least one opening therein defined at least partially by at least one opening wall and at least one expansion joint allowing expansion of the at least one opening via the at least one opening wall; and
   a liquid cooling medium flowing through the cooling device, wherein the at least one electrochemical storage cell is disposed in a respective one of the at least one opening and the outer curved surface least partially makes a force-fitting contact with the cooling device, the at least one expansion joint in an area of the force fitting contact.

2. The battery as recited in claim 1, wherein the cooling device includes a plastic and wherein the at least one opening and the at least one expansion joint are aligned predominantly in the direction of the longitudinal axis.

3. The battery as recited in claim 1, further comprising a housing surrounding the cooling device, and wherein the cooling device is configured to be sealed with respect to the at least one electrochemical storage cell and with respect to the housing.

4. The battery as recited in claim 3, further comprising a desiccant disposed in an area between the cooling device and the housing.

5. The battery as recited in claim 4, wherein the desiccant is in the form of at least one replaceable cartridge.

6. The battery as recited in claim 1, wherein the cooling device is a single integral part.

7. The battery as recited in claim 1, wherein the at least one electrochemical storage cell includes a plurality of electrochemical storage cells, each electrochemical storage cell including a longitudinal axis and the at least one opening includes a plurality of openings, each opening including a longitudinal axis, wherein each of the plurality of electrochemical storage cells is cylindrical, wherein the plurality of openings are arranged in a densest packing form so that the longitudinal axes run approximately parallel to each other.

8. The battery as recited in claim 7, wherein areas between each of the openings each include an aperture opening having a centered axis and separated from the cooling medium by aperture walls, the centered axes being arranged approximately parallel to the longitudinal axes.

9. The battery as recited in claim 8, wherein each of the openings include a respective one of the at least one expansion joint and wherein each of the aperture openings is connected to at least one opening by means of the respective expansion joint.

10. The battery as recited in claim 8, further comprising electrically conductive connections between poles of the plurality of electrochemical storage cells and/or electronic components passing through at least some of the aperture openings.

11. The battery as recited in claim 8, further comprising an attachment device configured to make the cooling device robust and/or connect the cooling device to the housing passing through at least some of the aperture openings.

12. The battery as recited in claim 8, wherein at least some of the aperture openings include a tubular projection configured to lengthen the respective aperture opening beyond an extent of the cooling device in a direction of the longitudinal axes.

13. The battery as recited in claim 1, wherein the cooling device includes walls, each wall and the at least one opening wall including a layer through which the cooling medium cannot diffuse.

14. A battery comprising:
    at least one electrochemical storage cell defining a longitudinal axis and having an outer surface curved in a direction perpendicular to the longitudinal axis;
    a cooling device having at least one opening therein and at least one expansion joint; and
    a liquid cooling medium flowing through the cooling device, wherein the at least one electrochemical storage cell is disposed in a respective one of the at least one opening and the outer curved surface least partially makes a force-fitting contact with the cooling device, the cooling device including at least one expansion joint associated with the at least one opening in an area of the force fitting contact;
    wherein the at least one electrochemical storage cell includes a plurality of electrochemical storage cells, each electrochemical storage cell including a longitudinal axis, and the at least one opening includes a plurality of openings, each opening including a longitudinal axis, wherein each of the plurality of electrochemical storage cells is cylindrical, wherein the plurality of openings are arranged in a densest packing form so that the longitudinal axes run approximately parallel to each other;
    wherein areas between each of the openings each include an aperture opening having a centered axis and separated from the cooling medium by aperture walls, the centered axes being arranged approximately parallel to the longitudinal axes;
    wherein the openings each include an opening wall, wherein each expansion joint includes an expansion joint wall, wherein cooling channels running parallel to the longitudinal axes are formed by the opening walls, the expansion joint walls, and the aperture walls, and wherein the cooling channels are connected to at least one main channel, the main channel being one of a distribution channel configured to distribute the cooling medium into the cooling channels and a collecting channel configured to collect the cooling medium from the cooling channels.

15. The battery as recited in claim 14, wherein the further openings and the aperture openings are passed through by the at least one main channel.

16. The battery as recited in claim 15, wherein the expansion joints extend insubstantially or not at all into the at least one main channel, wherein each of the openings have a larger diameter in an area of the at least one main channel than in an area of the respective expansion joints, and with the diameter in the area of the respective expansion joints is less than a diameter of the respective electrochemical storage cell when the respective electrochemical storage cell is not inserted in the opening.

17. The battery as recited in claim 14, further comprising flow resistance devices disposed in at least one of the cooling channels and the main channels at a region of a passage of the cooling medium into or out of the cooling channels.

18. The battery as recited in claim 14, wherein the cooling device has at least one inlet line and at least one outlet line for the cooling medium and a holding device disposed in an area of the at least one inlet and the at least one outlet lines.

19. A vehicle comprising:
   at least one electrical machine used for traction purposes; and
   a battery in operative connection with the at least one machine, wherein the battery includes:
   at least one electrochemical storage cell defining a longitudinal axis and having an outer surface curved in a direction perpendicular to the longitudinal axis;
   a cooling device having at least one opening therein defined at least partially by at least one opening wall and at least one expansion joint allowing expansion of the at least one opening via the at least one opening wall; and
   a liquid cooling medium flowing through the cooling device, wherein the at least one electrochemical storage cell is disposed in a respective on of the at least one opening and the outer curved surface least partially makes a force-fitting contact with the cooling device in an area of a respective one of the at least one expansion joint.

20. A method of providing electrical energy to an electrical machine used for traction purposes in a vehicle, the method comprising:
   providing a battery that includes:
      at least one electrochemical storage cell defining a longitudinal axis and having an outer surface curved in a direction perpendicular to the longitudinal axis;
      a cooling device having at least one opening therein defined at least partially by at least one opening wall and at least one expansion joint allowing expansion of the at least one opening via the at least one opening wall; and
      a liquid cooling medium flowing through the cooling device, wherein the at least one electrochemical storage cell is disposed in a respective on of the at least one opening and the outer curved surface at least partially makes a force-fitting contact with the cooling device in an area of a respective one of the at least one expansion joint;
   connecting the battery to the electrical machine; and
   providing electrical energy to the electrical machine.

* * * * *

UNITED STATES PATENT AND TRADEMARK OFFICE
CERTIFICATE OF CORRECTION

PATENT NO. : 7,531,269 B2  Page 1 of 1
APPLICATION NO. : 10/516051
DATED : May 12, 2009
INVENTOR(S) : Bernd Wegner It is certified that error appears in the above-identified patent and that said Letters Patent is hereby corrected as shown below:

In column 3, line 65 should read: "area of the at least one channel for collection and/or distribu-"

Signed and Sealed this

Twenty-fifth Day of August, 2009

David J. Kappos
*Director of the United States Patent and Trademark Office*